(12) United States Patent
Yamashita et al.

(10) Patent No.: US 8,786,149 B2
(45) Date of Patent: Jul. 22, 2014

(54) MOTOR AND MOTOR FOR ELECTRIC POWER STEERING

(75) Inventors: Yuuji Yamashita, Toyohashi (JP); Noriyuki Suzuki, Kosai (JP); Yasuyoshi Toda, Toyohashi (JP); Hiroyuki Kawata, Chiryu (JP)

(73) Assignees: Asmo Co., Ltd., Shizuoka-ken (JP); Denso Corporation, Aichi-ken (JP)

( * ) Notice: Subject to any disclaimer, the term of this patent is extended or adjusted under 35 U.S.C. 154(b) by 7 days.

(21) Appl. No.: 13/408,549

(22) Filed: Feb. 29, 2012

(65) Prior Publication Data

US 2012/0223624 A1 Sep. 6, 2012

(30) Foreign Application Priority Data

Mar. 4, 2011 (JP) ................. 2011-048022

(51) Int. Cl.
*H02K 7/00* (2006.01)
(52) U.S. Cl.
USPC .......................... 310/71; 310/416
(58) Field of Classification Search
USPC ................. 310/68 R, 71, 89, 416, 400
See application file for complete search history.

(56) References Cited

U.S. PATENT DOCUMENTS

| | | |
|---|---|---|
| 4,724,346 A | 2/1988 | Klein et al. |
| 5,864,192 A | 1/1999 | Nagate et al. |
| 6,707,185 B2 | 3/2004 | Akutsu et al. |
| 2009/0250287 A1* | 10/2009 | Takashima et al. ........... 180/444 |
| 2009/0251018 A1* | 10/2009 | Koshida .......................... 310/89 |
| 2012/0223623 A1 | 9/2012 | Yamashita et al. |

FOREIGN PATENT DOCUMENTS

| | | |
|---|---|---|
| JP | 5772188 A | 5/1982 |
| JP | 07029079 A | 1/1995 |
| JP | 10302882 A | 11/1998 |
| JP | 2000020112 A | 1/2000 |
| JP | 2000050595 A | 2/2000 |
| JP | 2001275310 A | 10/2001 |
| JP | 2003-204654 A | 7/2003 |
| JP | 2005098738 A | 4/2005 |
| JP | 2007094294 A | 4/2007 |
| JP | 2008056222 A | 3/2008 |
| JP | 2008109837 A | 5/2008 |
| JP | 2008220061 A | 9/2008 |
| JP | 2009132174 A | 6/2009 |
| JP | 2010172166 A | 8/2010 |
| JP | 2010273494 A | 12/2010 |
| JP | 2011048022 A | 3/2011 |
| WO | WO2007026894 A1 | 3/2007 |

* cited by examiner

*Primary Examiner* — Dang Le
(74) *Attorney, Agent, or Firm* — Faegre Baker Daniels LLP (57) ABSTRACT

A motor body has feeder terminals. Connecting ends of the corresponding feeder terminals are exposed radially outward from a motor case. The motor body has an end frame having an attachment portion. In this configuration, a control unit is fixed to the attachment portion and connecting terminals of the control unit are arranged to be allowed to contact the corresponding connecting ends. By fastening the fastening screws at positions radially outward of the motor case, the connecting terminals of the control unit are connected to the connecting ends of the motor body.

9 Claims, 7 Drawing Sheets

MOTOR AND MOTOR FOR ELECTRIC POWER STEERING

BACKGROUND OF THE INVENTION

The present invention relates a motor integrated with a control unit and a motor for an electric power steering.

Japanese Laid-Open Patent Publication No. 2003-204654 discloses an electric power steering having a motor. The electric power steering has a control unit attached to a side surface of a motor body. A drive control circuit in the control unit is electrically connected to the motor body. The motor body is a brushless motor having a resolver for detecting the rotational position of a rotor. The drive control circuit generates three phase drive current corresponding to the rotational position of the rotor based on a signal provided by the resolver. The drive current is supplied to drive coils of the corresponding phase, thus controlling rotation of the motor body.

To assemble the motor described in Japanese Laid-Open Patent Publication No. 2003-204654, a terminal of the control unit is inserted into the interior of the motor body. The terminal of the control unit is then fixed to a terminal of the motor body using screws. Assembly of the motor is completed by closing a motor case. When the terminal is fixed by the screws, undesirable particles may be produced. If the motor case is closed with such particles caught therein, the particles may interfere with a rotating component in the motor body to prevent a rotor from rotating smoothly. This may cause vibration or noise in the motor body, thus hampering quiet operation.

SUMMARY OF THE INVENTION

Accordingly, it is an objective of the present invention to provide a motor and a motor for an electric power steering that improve reliability and promote quiet operation through smooth rotor rotation by preventing undesirable particles produced in joint of a control unit to a motor body from being caught in the motor body.

To achieve the foregoing objective and in accordance with one aspect of the present invention, a motor having a motor body and a control unit joined to the motor body is provided. The control unit controls rotation of the motor body. A drive control circuit in the control unit is electrically connected to the motor body. The motor body includes a stator having a drive coil, a cylindrical motor case for accommodating the stator, and an end frame for closing an opening of the motor case. The end frame includes an attachment portion to which the control unit is attached. In the attachment portion, a connecting portion of a feeder member for supplying an electric current to the drive coil is exposed radially outward from the motor case. The control unit has a connecting terminal that is electrically connected to the drive control circuit to supply an electric current to the motor body. The control unit is fixed to the attachment portion of the motor body, and a connecting terminal of the control unit is arranged to be allowed to contact the connecting portion of the feeder member of the motor body. At a position radially outward of the motor case, the fastening member connects the connecting terminal of the control unit to the connecting portion of the feeder member.

In accordance with another aspect of the present invention, motor for an electric power steering employing the configuration of the above described motor is provided.

BRIEF DESCRIPTION OF THE DRAWINGS

FIG. 9 is a rear frame showing an end frame of another modification.

DETAILED DESCRIPTION OF THE PREFERRED EMBODIMENTS

One embodiment of a motor according to the present invention employed in an electric power steering (EPS) will now be described with reference to FIGS. 1A to 7.

As illustrated in FIGS. 1A to 1C and 2, a motor 10 has a motor body 10A and a control unit 10B, which is joined to the motor body 10A.

The motor body 10A is formed by a brushless motor. The motor body 10A has a motor case 11 having a lidded cylindrical shape. An annular stator 12 is fixed to the inner peripheral surface of the motor case 11. A rotor 15 is arranged in the stator 12. Drive coils 14$u$, 14$v$, 14$w$ for three phases, which are U, V, and W phases, are mounted in a stator core 13 of the stator 12. When three phase electric current is supplied from a control unit 10B to the stator 12, the stator 12 produces a rotating magnetic field, thus rotating the rotor 15.

The rotor 15 has a rotor core 16, a rotary shaft 17, which is received in a central portion of the rotor core 16, and a magnet 18 fixed to the outer peripheral surface of the rotor core 16. The proximal end of the rotary shaft 17 is supported by the bottom of the motor case 11 through a bearing 19. The distal end of the rotary shaft 17 is supported by a central portion of an end frame 20, which closes an opening 11$a$ formed in the motor case 11, through a bearing 21. The end frame 20 is attached to the wall around the opening 11$a$ using a plurality of fixing screws 22. The distal end of the rotary shaft 17 projects outward from the end frame 20 and is connected to a steering mechanism (not shown) through a connection member 23.

Figure 1A:
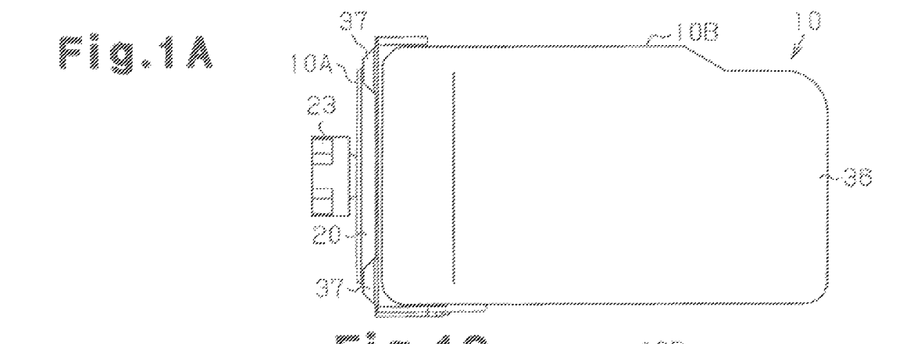
FIG. 1A is a plan view showing a motor integrated with a control unit according to one embodiment of the present invention.
Figure 1B:
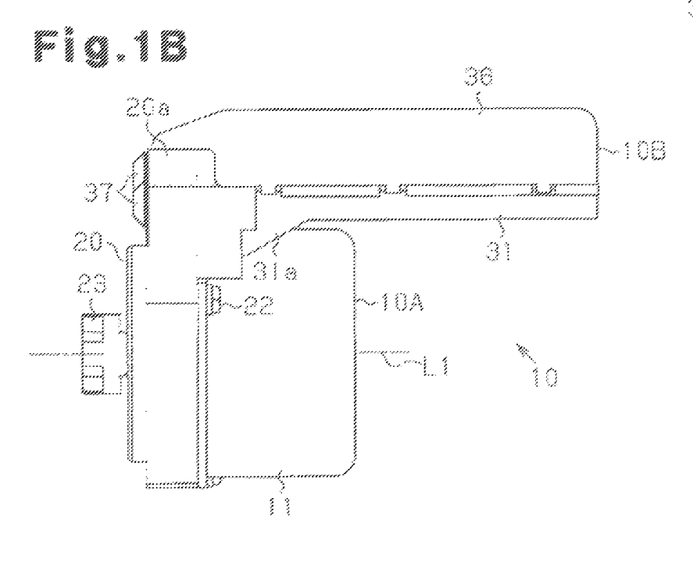
FIG. 1B is a side view showing the control unit-integrated motor.
Figure 1C:
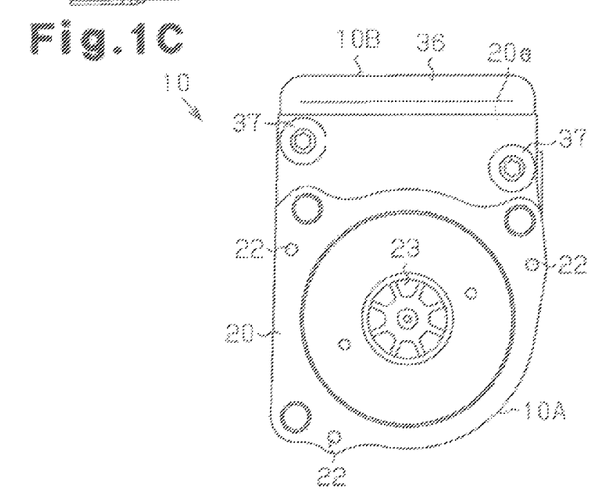
FIG. 1C is a front view showing the control unit-integrated motor.
Figure 2:
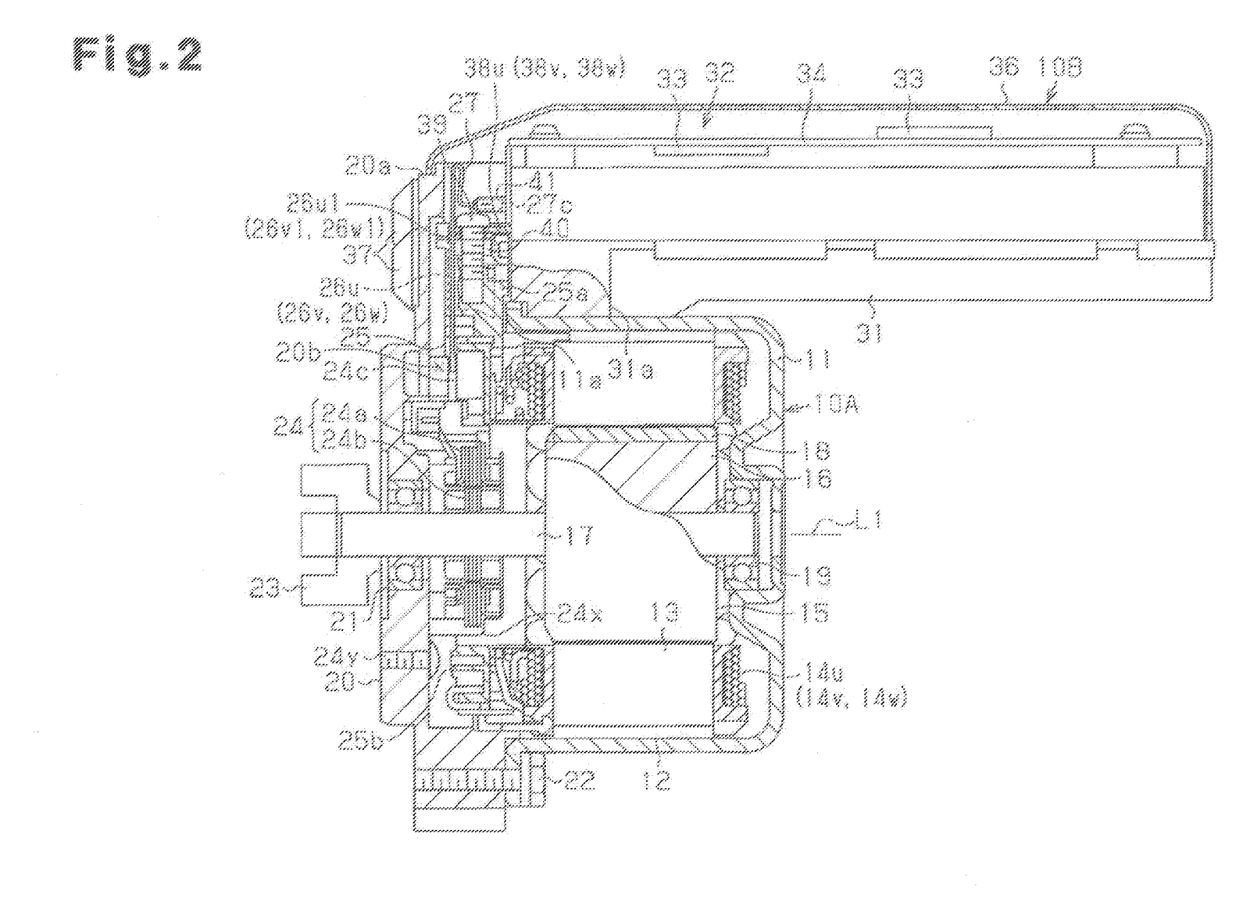
FIG. 2 is a cross-sectional view showing the control unit and a motor body.
Figure 5:
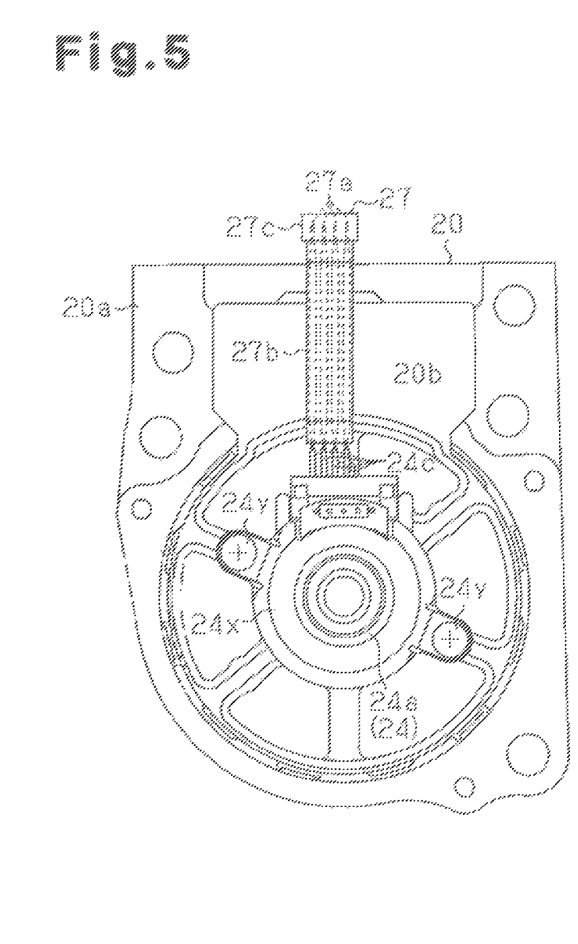
FIG. 5 is a rear view showing an end frame.

A resolver 24 is arranged in the vicinity of the opening 11$a$ of the motor case 11 as a sensor for detecting the rotational position of the rotor 15. The resolver 24 has an annular resolver stator 24$a$ and a resolver rotor 24$b$, which is arranged at the inner side of the resolver stator 24$a$. As shown in FIG. 5, the resolver stator 24$a$ is fixed to the end frame 20 together with an attachment cover 24$x$, which covers the resolver stator 24$a$, by means of fixing screws 24$y$. With reference to FIG. 2, the resolver rotor 24$b$ is fixed to the rotary shaft 17.

A drive control circuit 32 in the control unit 10B detects the rotational position of the rotor 15 based on a detection signal output from the resolver 24. In the present embodiment, an error caused in assembly of components including the resolver 24 is corrected at the time of detection of the rotational position by the drive control circuit 32. In other words, the error in assembly is electrically absorbed, thus making it unnecessary to perform position adjustment when the resolver stator 24a is mounted. In this case, such correction, which is performed at the time of detection of the rotational position, is carried out by memorizing the phase difference between an output waveform of the resolver 24 and an induced voltage waveform of the motor body 10A and canceling the phase difference.

Figure 6:
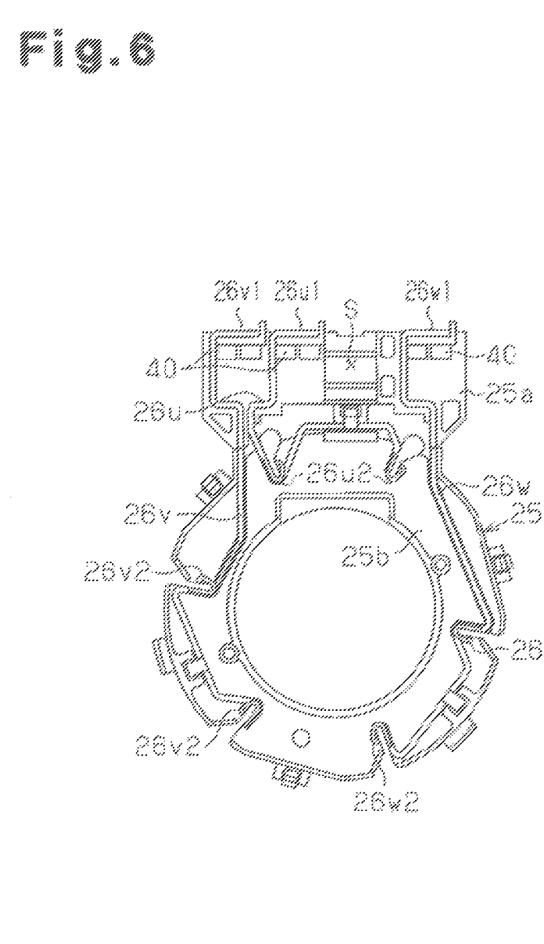
FIG. 6 is a front view showing a holder member as viewed from the side corresponding to the end frame.

A holder member 25, which is illustrated in FIG. 6, is arranged around the resolver 24 to support feeder terminals 26u, 26v, 26w of the three phases. The holder member 25 is attached to the stator 12. An electric current from the control unit 10B is supplied to the drive coil 14u, 14v, 14w of the corresponding phase through the feeder terminal 26u, 26v, 26w of the phase. With reference to FIGS. 2 and 6, the holder member 25 has a substantially annular ring 25b capable of receiving the resolver 24 and a projection 25a, which projects radially outward from a portion of the ring 25b. The projection 25a projects from between the opening 11a of the motor case 11 and the end frame 20 to the exterior. The feeder terminals 26u, 26v, 26w of the three phases are supported each by the holder member 25 in a manner straddling the ring 25b and the projection 25a.

The feeder terminal 26u, 26v, 26w of each phase is formed by bending a conductive metal plate having a substantially uniform width. The direction of the width of each feeder terminal 26u, 26v, 26w is parallel to the axis L1 of the motor body 10A. The feeder terminals 26u, 26v, and 26w of the three phases include wire connecting portions 26u2, 26v2, and 26w2, respectively. The wire connecting portions 26u2, 26v2, 26w2 are arranged at respective predetermined positions in the ring 25b. The feeder terminal 26u, 26v, 26w of each phase is connected to the terminal wire of the drive coil 14u, 14v, 14w of the phase.

Figure 3:
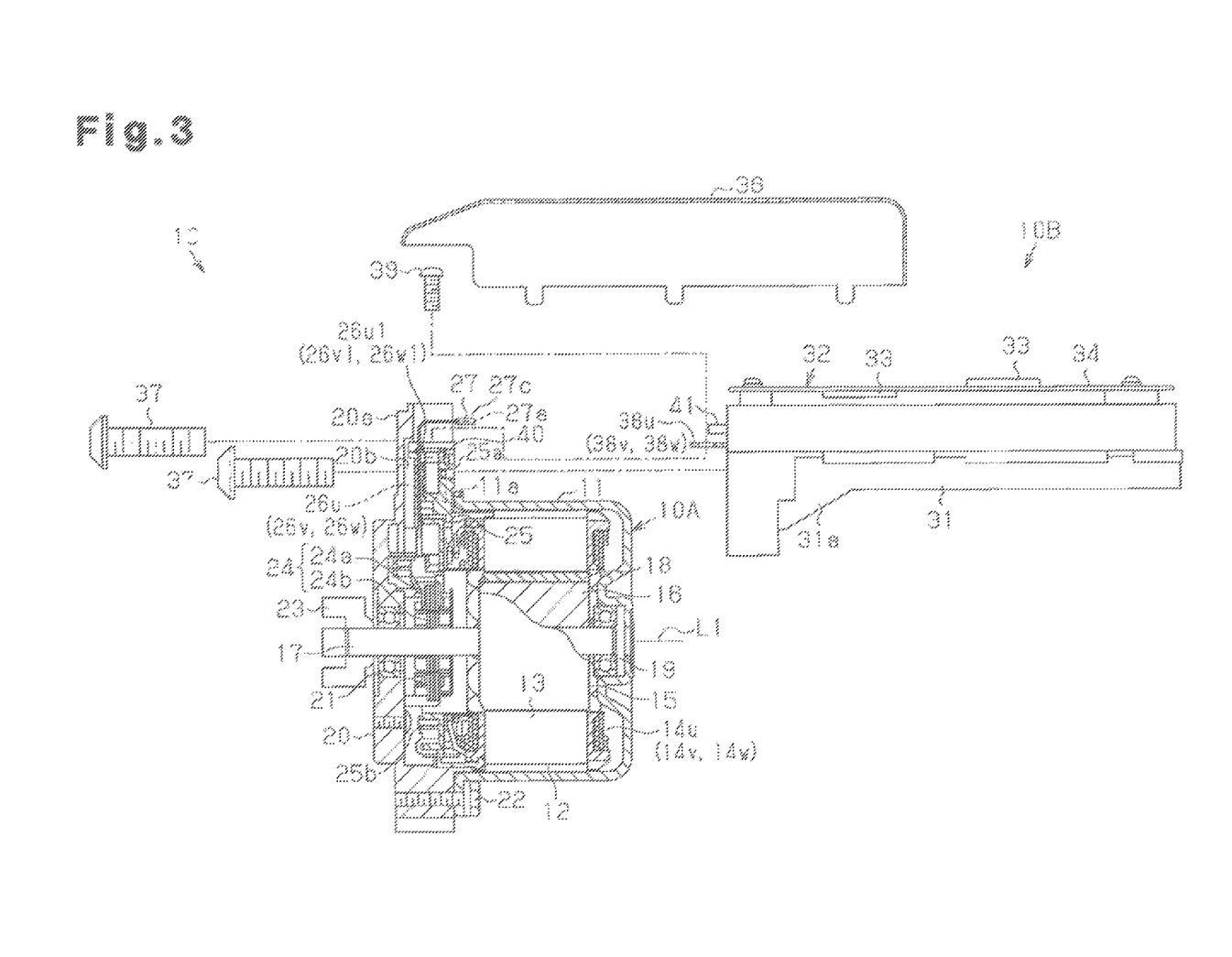
FIG. 3 is a cross-sectional view showing the control unit and the motor body before the control unit is attached to the motor body.
Figure 4:
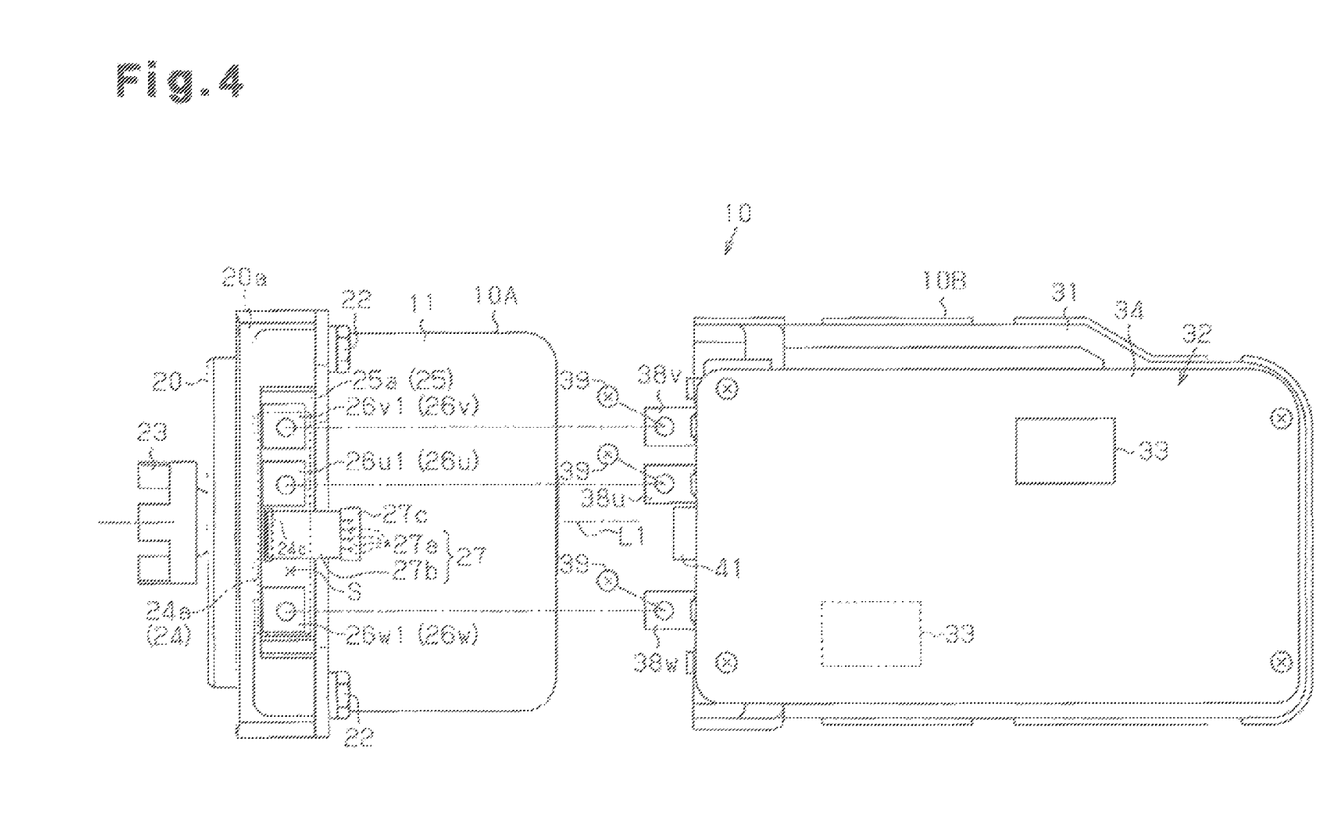
FIG. 4 is a plan view showing the control unit and the motor body before the control unit is attached to the motor body.

With reference to FIGS. 3 and 4, connecting ends 26u1, 26v1, 26w1 of the corresponding feeder terminals 26u, 26v, 26w of the three phases are exposed on the outer end surface of the projection 25a. Each of the connecting ends 26u1, 26v1, 26w1 is formed as a flat plate extending in a direction perpendicular to a radial direction of the motor body 10A, or, in other words, along the axis L1 of the motor body 10A. The connecting ends 26u1, 26v1, 26w1 of the three phases are aligned in a circumferential direction of the motor body 10A. In the present embodiment, the connecting end 26v1 of V phase, the connecting end 26u1 of U phase, and the connecting end 26w1 of W phase are arranged sequentially in this order. A clearance S is formed between the connecting end 26u1 of U phase and the connecting end 26w1 of W phase. An end of a flat cable 27, which is connected to the resolver stator 24a, is extended out to the exterior of the motor body 10A through the clearance S. The end of the flat cable 27 and the connecting ends 26u1, 26v1, 26w1 of the three phases are aligned in the circumferential direction.

Figure 7:
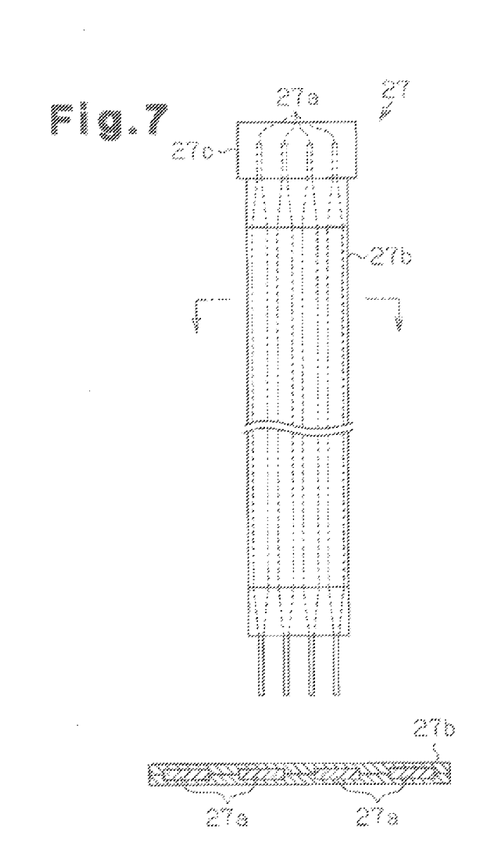
FIG. 7 is a plan view with a cross-sectional view showing a flat cable.

The flat cable 27 is formed by coating four parallel conductor lines 27a using an elongated coating material 27b. The flat cable 27 is easy to bend in the thickness direction but hard in the width direction. As illustrated in FIG. 7, each of the conductor lines 27a is formed by a round wire. The portion of each conductor line 27a coated by the coating material 27b is formed flat by flattening the round wire in the direction of the thickness of the flat cable 27. This makes it easy for the flat cable 27 to flex in the thickness direction. The flat cable 27 is arranged such that the width direction of the flat cable 27 corresponds with the direction in which the connecting ends 26u1, 26v1, 26w1 are aligned.

With reference to FIG. 4, a sensor terminal 24c of the resolver stator 24a is arranged on the axis L1 of the motor body 10A. The flat cable 27 is extended straight out from the clearance S without bending in the width direction from the connecting portion with respect to the resolver stator 24a. This is brought about by structural characteristics of the flat cable 27 and decreases the length of the flat cable 27 as a whole. In other words, the positions of the connecting ends 26u1, 26v1, 26w1 and the position of the clearance S are set such that the flat cable 27 is extended out in the above-described manner. In the present embodiment, as has been described, since an error caused in assembly of components including the resolver 24 is electrically absorbed, it is unnecessary to provide a structure for adjusting the circumferential position of the resolver stator 24a. This allows use of the flat cable 27, which is difficult to bend in the circumferential direction.

As illustrated in FIGS. 1 to 4, the end frame 20 has an attachment portion 20a, which extends radially outward. The attachment portion 20a covers the surface of the projection 25a opposite to the motor case 11 and opposite side surfaces of the projections 25a. The end frame 20 has an accommodating recess 20b for accommodating the holder member 25. The accommodating recess 20b has an opening, which faces in the direction of the axis L1 of the motor body 10A. The attachment portion 20a has an opening, which faces in a radial direction of the motor body 10A. The distal surface of the projection 25a is exposed from the opening of the attachment portion 20a to expose the connecting ends 26u1, 26v1, 26w1. A base member 31, which is a component of the control unit 10B, is attached to the attachment portion 20a.

The base member 31 has a substantially rectangular shape extending along the axis L1 of the motor body 10A. The drive control circuit 32 for driving and controlling the motor body 10A is mounted in the base member 31. The drive control circuit 32 is formed by a circuit substrate 34 and various types of circuit components 33, which are connected to the circuit substrate 34. The drive control circuit 32 is connected to a steering ECU through a connector (not shown) formed on the circuit substrate 34. A cover member 36 is swaged onto the base member 31 to cover the drive control circuit 32.

An end surface of the base member 31 faces the attachment portion 20a of the end frame 20 and extends perpendicularly to the axis L1 of the motor body 10A. The end surface of the base member 31 is fastened to the attachment portion 20a of the end frame 20 in the direction of the axis L1 using two fixing screws 37. The fixing screws 37 are arranged near opposite side portions of the projections 25a of the holder member 25. A contact portion 31a is formed on a side surface of an end portion of the base member 31. When the base member 31 is fixed to the holder member 25, the contact portion 31a is held in contact with the outer peripheral surface of the motor case 11. However, the contact portion 31a does not necessarily have to contact the outer peripheral surface of the motor case 11.

As illustrated in FIG. 4, connecting terminals 38u, 38v, and 38w of U, V, and W phases project from the end surface of the base member 31 in a longitudinal direction of the base member 31. In other words, the connecting terminals 38u, 38v, 38w of the three phases project from the end surface of the base member 31 along the axis L1 of the motor body 10A. The connecting terminals 38u, 38v, 38w of the phases are aligned in correspondence with the connecting ends 26u1, 26v1, 26w1 of the corresponding feeder terminals 26u, 26v, 26w. The connecting terminals 38u, 38v, 38w are electrically connected to the circuit substrate 34 of the drive control circuit 32. As shown in FIG. 2, when the base member 31 is attached to the end frame 20, the connecting terminals 38u, 38v, 38w radially overlap with the connecting ends 26u1, 26v1, 26w1 of the feeder terminals 26u, 26v, 26w. The connecting terminal 38u, 38v, 38w of each phase and the corresponding connecting end 26u1, 26v1, 26w1 are connected to and radially pressed against each other using a fastening screw 39. The fastening screw 39 is threaded onto a nut 40 mounted in the projection 25a of the holder member 25. The end of the flat cable 27 extended out from the motor body 10A is formed as a connector 27c, which is engaged with a connector 41. The connector 41 is electrically connected to the circuit substrate 34 in the base member 31. This electrically connects the drive control circuit 32 to the drive coils 14u, 14v, 14w of the three phases through the corresponding feeder terminals 26u, 26v, 26w. The drive control circuit 32 is electrically connected also to the resolver stator 24a through the flat cable 27.

A procedure of joining the control unit 10B to the motor body 10A will hereafter be described with reference to FIGS. 3 and 4.

In advance, the motor body 10A is assembled and the drive control circuit 32 is mounted in the control unit 10B. The base member 31 is then attached to the attachment portion 20a of the end frame 20 in the direction of the axis L1 using the two fixing screws 37. This closes the accommodating recess 20b of the attachment portion 20a by means of the base member 31. With the base member 31 attached to the attachment portion 20a, the connecting terminals 38u, 38v, 38w of the three phases are located to overlap the connecting ends 26u1, 26v1, 26w1 of the feeder terminals 26u, 26v, 26w.

Subsequently, the connecting terminals 38u, 38v, 38w of the three phases are radially fastened to the corresponding connecting ends 26u1, 26v1, 26w1 using the three fastening screws 39. The connector 27c of the flat cable 27 is engaged with the connector 41, which is connected to the circuit substrate 34 of the drive control circuit 32. The order for performing fixation of the control unit 10B using the fixing screws 37, connection between the connecting terminals 38u, 38v, 38w and the corresponding connecting ends 26u1, 26v1, 26w1, and connection of the flat cable 27 may be modified as needed. The cover member 36 is then attached to the base member 31 to cover the drive control circuit 32. The radial opening of the attachment portion 20a is thus closed and the control unit 10B is joined to the motor body 10A. In this manner, the motor 10 for an EPS integrated with a control unit is completed.

In the drive control circuit 32, the circuit components 33 are operated to produce three phase drive current. The drive current is supplied from the connecting terminals 38u, 38v, 38w of the corresponding phases to the associated drive coils 14u, 14v, 14w in the stator 12 through the connecting ends 26u1, 26v1, 26w1 of the feeder terminals 26u, 26v, 26w. This causes the stator 12 to produce a rotating magnetic field, which rotates the rotor 15. The rotary shaft 17 thus rotates integrally with the rotor 15, and rotation of the rotary shaft 17 is transmitted to a steering mechanism through the connection member 23. In this manner, steering operation is assisted. Further, when the rotor 15 rotates, the resolver rotor 24b also rotates and the resolver stator 24a outputs a detection signal in correspondence with the rotational position of the rotor 15. The detection signal is provided to the drive control circuit 32 through the flat cable 27. The drive control circuit 32 acknowledges the rotational position of the rotor 15 based on the detection signal provided by the resolver stator 24a. Then, the drive control circuit 32 generates an appropriate drive current together with a command through the steering ECU, thus executing rotation control on the motor body 10A.

The present embodiment has the advantages described below.

(1) In the motor body 10A, the connecting ends 26u1, 26v1, 26w1 of the feeder terminals 26u, 26v, 26w are exposed radially outward from the motor case 11. The control unit 10B is fixed to the end frame 20 of the motor body 10A, and the connecting terminals 38u, 38v, 38w of the control unit 10B are arranged to be allowed to contact the corresponding connecting ends 26u1, 26v1, 26w1. The connecting terminals 38u, 38v, 38w of the control unit 10B are connected to the corresponding connecting ends 26u1, 26v1, 26w1 of the motor body 10A by fastening the fastening screws 39 at the positions radially outward of the motor case 11. In this configuration, the connecting terminals 38u, 38v, 38w of the control unit 10B can be connected to the connecting ends 26u1, 26v1, 26w1 of the motor body 10A at the positions radially outward of the motor case 11 of the motor body 10A, which has been completed. This prevents undesirable particles produced by fastening the fastening screws 39 from being caught in the motor body 10A. The undesirable particles thus do not interfere with a rotating component in the motor body 10A to hamper smooth rotation of the rotor 15. Vibration or noise, which is otherwise caused by the undesirable particles, is thus prevented from occurring. This improves reliability and promotes quiet operation of the motor 10. Also, connection between the connecting terminals 38u, 38v, 38w of the control unit 10B and the connecting ends 26u1, 26v1, 26w1 of the motor body 10A by fastening the fastening screws 39 is facilitated.

(2) The end frame 20 has the accommodating recess 20b, which is formed in the surface facing the motor case 11. The accommodating recess 20b has openings in two directions, which are an axial opening and a radial opening. The fastening screws 39 are fastened in the accommodating recess 20b. In other words, the connecting portions between the connecting terminals 38u, 38v, 38w of the control unit 10B and the connecting ends 26u1, 26v1, 26w1 of the motor body 10A are received in the accommodating recess 20b of the end frame 20. This decreases the axial dimension of the motor body 10A, thus reducing the axial dimension of the end frame 20 and the axial dimension of the control unit 10B. The motor 10 as a whole is thus reduced in size. As a result, when the motor 10 is mounted in a vehicle, another component may be arranged in space axially adjacent to the motor body 10A and the control unit 10B. Further, the two openings, which are the axial and radial openings, of the accommodating recess 20b, facilitate fastening of the fastening screws 39.

(3) With the connecting terminals 38u, 38v, 38w of the control unit 10B arranged to overlap in the radial direction with the connecting ends 26u1, 26v1, 26w1 of the motor body 10A, the connecting terminals 38u, 38v, 38w are connected to the connecting ends 26u1, 26v1, 26w1 by fastening the fastening screws 39 radially. This facilitates fastening of the fastening screws 39.

(4) The motor body 10A is formed by a brushless motor. The axial positions of the connecting ends 26u1, 26v1, 26w1 of the feeder terminals 26u, 26v, 26w of the three phases correspond to one another. The connecting ends 26u1, 26v1, 26w1 are aligned in the circumferential direction. This decreases the axial dimension of the connecting end 26u1, 26v1, 26w1 of each feeder terminal 26u, 26v, 26w. The axial dimension of the motor body 10A is reduced, accordingly. As a result, the axial dimension of the end frame 20 and the axial dimension of the control unit 10B are decreased, and the size of the motor 10 as a whole is reduced.

(5) Since the axial position of the flat cable 27, which is connected to the resolver 24, corresponds to the axial positions of the connecting ends 26u1, 26v1, 26w1 of the phases, the axial dimension of the motor body 10A is reduced, accordingly. As a result, the axial dimension of the end frame 20 and the axial dimension of the control unit 10B are decreased, and the size of the motor 10 as a whole is reduced.

(6) The position of the resolver 24 in the direction of the axis L1 corresponds to the position of each feeder terminal 26u, 26v, 26w (the holder member 25) in the direction of the axis L1. This decreases the axial direction of the motor body 10A.

(7) The control unit 10B has the base member 31 in which the drive control circuit 32 is mounted. The connecting terminals 38u, 38v, 38w project from an end surface of the base member 31. The cover member 36 is attached to the base member 31 to cover the drive control circuit 32 and the connecting portions of the connecting terminals 38u, 38v, 38w. In this configuration, since the connecting terminals 38u, 38v, 38w are projected, the motor body 10A is easily positioned relative to the connecting ends 26u1, 26v1, 26w1. Also, the connecting portions of the connecting terminals 38u, 38v, 38w, together with the drive control circuit 32, are covered by the cover member 36. The connecting portions of the connecting terminals 38u, 38v, 38w are thus protected and sealed.

(8) The axial opening of the accommodating recess 20b of the end frame 20 is closed by the base member 31 of the control unit 10B at the position radially outward of the motor case 11. The radial opening of the accommodating recess 20b is blocked by the cover member 36. In other words, using the base member 31 and the cover member 36, both the axial opening and the radial opening of the accommodating recess 20b are efficiently closed.

(9) The control unit 10B is fixed to the motor body 10A in the direction of the axis L1 using the fixing screws 37. As a result, the control unit 10B is easily joined to the motor body 10A.

The above illustrated embodiment may be modified to the forms described below.

Figure 8A:
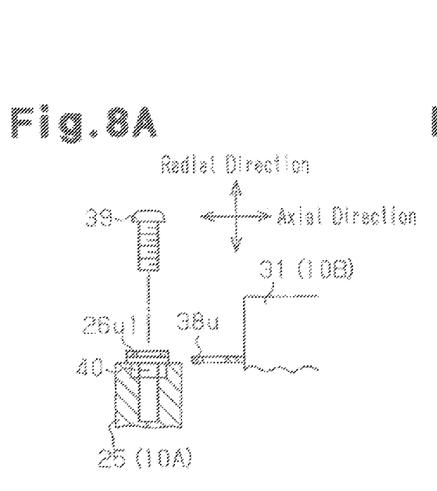
FIGS. 8A, 8B, 8C, and 8D are cross-sectional views each showing a portion corresponding to a connecting structure of a feeder terminal of a modification.

As illustrated in FIG. 8A, the connecting terminal 38u may be arranged to overlap with the connecting end 26u1 at a position radially inward of the connecting end 26u1. In this state, the connecting terminal 38u is connected to the connecting end 26u1 by fastening the fastening screw 39 from a radially outward position.

Figure 8B:
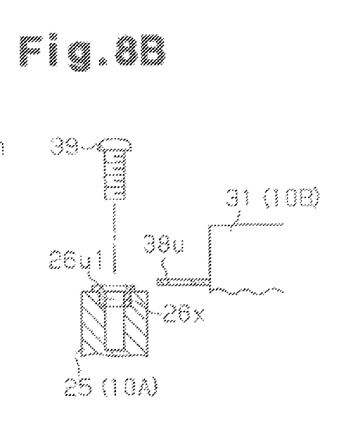

As illustrated in FIG. 8B, the nut 40 may be replaced by a nut portion 26x, which is formed by subjecting the connecting end 26u1 of the motor body 10A to burring and forming a threaded portion in the inner peripheral surface of the connecting end 26u1. In this case, the connecting terminal 38u of the control unit 10B is arranged overlap with the connecting end 26u1 of the motor body 10A at a position radially outward to the connecting end 26u1. In this state, the connecting terminal 38u is connected to the nut portion 26x of the connecting end 26u1 by fastening the fastening screw 39 from a radially outward position.

Figures 8C, 8D:
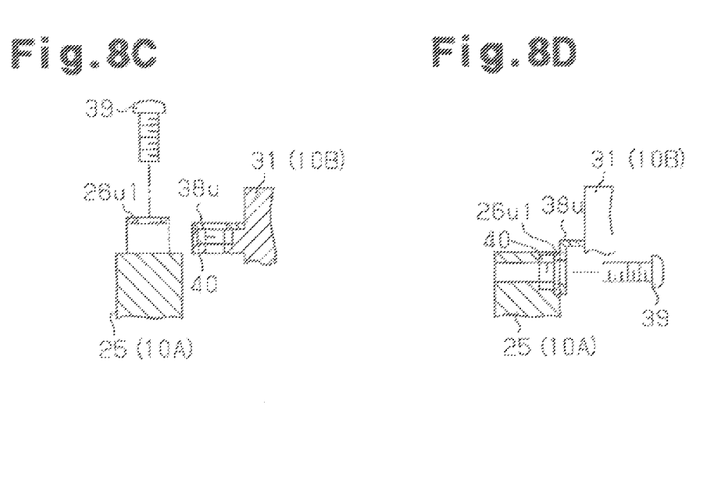

With reference to FIG. 8C, the nut 40 may be formed adjacently to the connecting terminal 38u in the base member 31 of the control unit 10B. In this case, the connecting terminal 38u and the nut 40 of the control unit 10B are arranged to overlap with the connecting end 26u1 of the motor body 10A at a position radially inward of the connecting end 26u1. In this state, the connecting end 26u1, the connecting terminal 38u, and the nut 40 are connected together by fastening the fastening screw 39 from a radially outward position.

As illustrated in FIG. 8D, with the connecting end 26u1 of the motor body 10A arranged to axially overlap with the connecting terminal 38u of the control unit 10B, the connecting terminal 38u may be connected to the connecting end 26u1 by fastening the fastening screw 39 in the axial direction.

In the forms of FIGS. 8A to 8D, the connecting terminal 38u and the connecting end 26u1 may be connected to each other using any suitable fastening member other than the fastening screw 39 and the nut 40 (the nut portion 26x).

The shape of the attachment portion 20a of the end frame 20 and the shape of the accommodating recess 20b may be modified as needed.

As illustrated in FIG. 9, the shape of the attachment portion 20a may be modified as will be described. Specifically, a pair of attachment blocks 20c may be arranged at opposite sides of the accommodating recess 20b. The upper ends of the attachment blocks 20c are connected to each other by a connecting wall 20d. In this case, the accommodating recess 20b has an axial opening and local radial openings through a plurality of through holes 20e. This configuration improves rigidity of the attachment portion 20a, thus allowing stable fixation of the control unit 10B to the attachment portion 20a. In this case, the fastening screws 39 must be fastened in the accommodating recess 20b using a tool from radially outward positions. Each of the through holes 20e is thus sized to allow the tool to pass through the through hole 20e.

In the illustrated embodiment, a cover member for covering the drive control circuit 32 and a cover member for covering the connecting portions of the connecting terminals 38u, 38v, 38w may be formed separately from each other.

In the illustrated embodiment, the control unit 10B is fixed to the motor body 10A along the axis L1 using the fixing screws 37. However, the control unit 10B may be fixed radially.

In the illustrated embodiment, the connecting ends 26u1, 26v1, 26w1 may be arranged sequentially in the circumferential direction. The flat cable 27 and the connecting ends 26u1, 26v1, 26w1 may be aligned in either the circumferential direction or the axial direction. Also, the connecting ends 26u1, 26v1, 26w1 may be arranged in any suitable direction other than the circumferential direction.

In the illustrated embodiment, the order of the circumferential arrangement of the connecting ends 26u1, 26v1, 26w1 of the feeder terminals 26u, 26v, 26w may be changed. In correspondence with the arrangement order of the connecting ends 26u1, 26v1, 26w1, the arrangement order of the connecting terminals 38u, 38v, 38w of the control unit 10B must be changed.

As the signal cable for connecting the resolver 24 to the drive control circuit 32, a lead wire or a terminal may be employed instead of the flat cable 27.

In the illustrated embodiment, the motor body 10A may be any suitable motor other than a brushless motor.

The present invention may be used in a motor employed for other purposes than an electric power steering (EPS).

We claim:

1. A motor having a motor body and a control unit joined to the motor body, the control unit controlling rotation of the motor body, a drive control circuit in the control unit being electrically connected to the motor body, wherein the motor body includes:
a stator having a drive coil;
a cylindrical motor case for accommodating the stator;
an end frame for closing an opening of the motor case;
a holder member supporting a feeder member for supplying an electric current to the drive coil; and
a sensor for detecting a rotational position of a rotor,
the end frame includes an attachment portion to which the control unit is attached, in the attachment portion, a connecting portion of the feeder member is exposed radially outward from the motor case, the control unit has a connecting terminal that is electrically connected to the drive control circuit to supply an electric current to the motor body, the control unit is fixed to the attachment portion of the motor body, and the connecting terminal of the control unit is arranged to be allowed to contact the connecting portion of the feeder member of the motor body, the control unit is arranged at a position radially outward of the motor case, at a position radially outward of the motor case, a fastening member connects the connecting terminal of the control unit to the connecting portion of the feeder member, a connecting cable of the sensor and the connecting portion of the feeder member are aligned in a circumferential direction of the motor body, and the sensor is arranged on the inside in the radial direction of the holder member.

2. The motor according to claim 1, wherein
the end frame has a recess formed in a surface facing the motor case,
the recess has a plurality of openings, which includes an axial opening and a radial opening,
the recess is arranged radially outward of the motor case, and
in the recess, the connecting terminal of the control unit is connected to the connecting portion of the feeder member of the motor body.

3. The motor according to claim 1, wherein, the connecting terminal of the control unit is arranged to overlap the connecting portion of the feeder member of the motor body in a radial direction of the motor body, and the fastening member is fastened in a radial direction of the motor body to connect the connecting terminal of the control unit to the connecting portion of the feeder member of the motor body.

4. The motor according to claim 1, wherein
the motor body is rotated by supplying an electric current to a plurality of phases,
the feeder member is one of feeder members provided in correspondence with the respective phases, and
the connecting portions of the feeder members of the phases are located at the same positions in the axial direction of the motor body, and aligned in the circumferential direction of the motor body.

5. The motor according to claim 1, wherein the sensor is arranged at a position overlapping the positions of the connecting portions of the feeder members in the axial direction of the motor body.

6. The motor according to claim 1, wherein
the control unit includes the drive control circuit for controlling the motor body and a base member, in which the drive control circuit is mounted;
the connecting terminal projects from an end surface of the base member, and
a cover member is attached to the base member to cover the drive control circuit and a connecting portion of the connecting terminal.

7. The motor according to claim 6, wherein
the end frame has a recess formed in a surface facing the motor case,
the recess has a plurality of openings, which includes an axial opening and a radial opening,
in the recess, the connecting terminal of the control unit is connected to the connecting portion of the feeder member of the motor body, and
at positions radially outward of the motor case, the axial opening of the recess is closed by the base member of the control unit and the radial opening of the recess is closed by the cover member.

8. The motor according to claim 1, wherein the control unit is fixed to the motor body in the axial direction of the motor body using a control unit fastening member.

9. A motor for an electric power steering employing the configuration of the motor according to claim 1.

* * * * *